US009718465B2

(12) United States Patent
Seagraves et al.

(10) Patent No.: US 9,718,465 B2
(45) Date of Patent: Aug. 1, 2017

(54) BICYCLE STABILITY CONTROL METHODS AND SYSTEMS

(71) Applicant: Ford Global Technologies, LLC, Dearborn, MI (US)

(72) Inventors: Jamel Seagraves, Mountain View, CA (US); Darioush Aghai-yazdi, San Carlos, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 14/807,706

(22) Filed: Jul. 23, 2015

(65) Prior Publication Data
US 2017/0021827 A1    Jan. 26, 2017

(51) Int. Cl.
| | | |
|---|---|---|
| *B60W 30/04* | (2006.01) |
| *B60W 10/04* | (2006.01) |
| *B62M 1/36* | (2013.01) |
| *B60W 10/20* | (2006.01) |
| *B60W 10/184* | (2012.01) |

(52) U.S. Cl.
CPC ......... *B60W 30/04* (2013.01); *B60W 10/04* (2013.01); *B60W 10/184* (2013.01); *B60W 10/20* (2013.01); *B62M 1/36* (2013.01); *B60W 2030/043* (2013.01); *B60W 2300/36* (2013.01); *B60W 2520/10* (2013.01); *B60W 2520/105* (2013.01); *B60W 2520/18* (2013.01); *B60W 2520/28* (2013.01); *B60W 2710/18* (2013.01); *B60W 2710/20* (2013.01)

(58) Field of Classification Search
CPC .... B60W 30/04; B60W 10/04; B60W 10/184; B60W 10/20; B60W 2030/043; B60W 2300/36; B60W 2520/10; B60W 2520/105; B60W 2520/18; B60W 2520/28; B60W 2710/18; B60W 2710/20; B62M 1/36
See application file for complete search history.

(56) References Cited

U.S. PATENT DOCUMENTS

| | | |
|---|---|---|
| 6,895,318 B1 | 5/2005 | Barton |
| 8,251,390 B2 | 8/2012 | Reichstetter |
| 8,615,356 B2 | 12/2013 | Ahlstedt |
| 9,381,914 B2 * | 7/2016 | Klews ................... B60W 10/18 |

(Continued)

FOREIGN PATENT DOCUMENTS

| | | |
|---|---|---|
| CN | 203111409 U | 8/2013 |
| FR | 2749819 B1 | 12/1997 |

OTHER PUBLICATIONS

Lam, "Gyroscopic Stabilization of a Kid-Size Bicycle", IEEE 5th International Conference on Cybernetics and Intelligent Systems, Sep. 2011, pp. 247-252.*

*Primary Examiner* — Todd Melton
(74) *Attorney, Agent, or Firm* — David R. Stevens; Stevens Law Group

(57) ABSTRACT

Methods, devices and apparatuses pertaining to stability control of a bicycle. A method may involve a control system associated with a bicycle monitoring one or more parameters related to a movement of the bicycle. The method may also involve the control system detecting an impending occurrence of an event based on the monitoring. The method may further involve the control system adjusting one or more operations related to the movement of the bicycle, including braking of the bicycle, to prevent the occurrence of the event.

20 Claims, 4 Drawing Sheets

(56) References Cited

U.S. PATENT DOCUMENTS

2008/0295595 A1* 12/2008 Tacklind ............... A61G 5/14
 73/462
2013/0066522 A1 3/2013 Haas

* cited by examiner

BICYCLE STABILITY CONTROL METHODS AND SYSTEMS

TECHNICAL FIELD

The present disclosure generally relates to traffic safety and, more particularly, to methods and devices for stability control of a bicycle.

BACKGROUND

Bicyclists often need to exert significantly more effort than do car drivers to achieve satisfactory stability while cornering. For instance, a cyclist would need to maintain knowledge of their speed, lean angle, brake effort, pedal effort and handlebar angle to approximate the stability of the bicycle while cornering. This is particularly critical to mountain bikers who generally ride on rough, inconsistent terrain. Furthermore, bicycles offer significantly less protection than do other forms of vehicles in an event of accident or fall.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In view of the safety concerns mentioned above, it would be helpful to have a system that prevents loss of stability on a bicycle, thereby tremendously reducing the risk that a cyclist faces on the road. Accordingly, the present disclosure provides a method, device and system that monitors cornering stability of a bicycle and is able to intervene the maneuvering of the bicycle to prevent accidents such as falling. Embodiments of the present disclosure may be implemented in bicycles and electric bicycles (also known as e-bikes or booster bikes) as well as in motorcycles and other types of vehicles that travel on a road surface. Embodiments of the present disclosure may be embedded or built directly in a bicycle or as an aftermarket solution.

Figure 1:
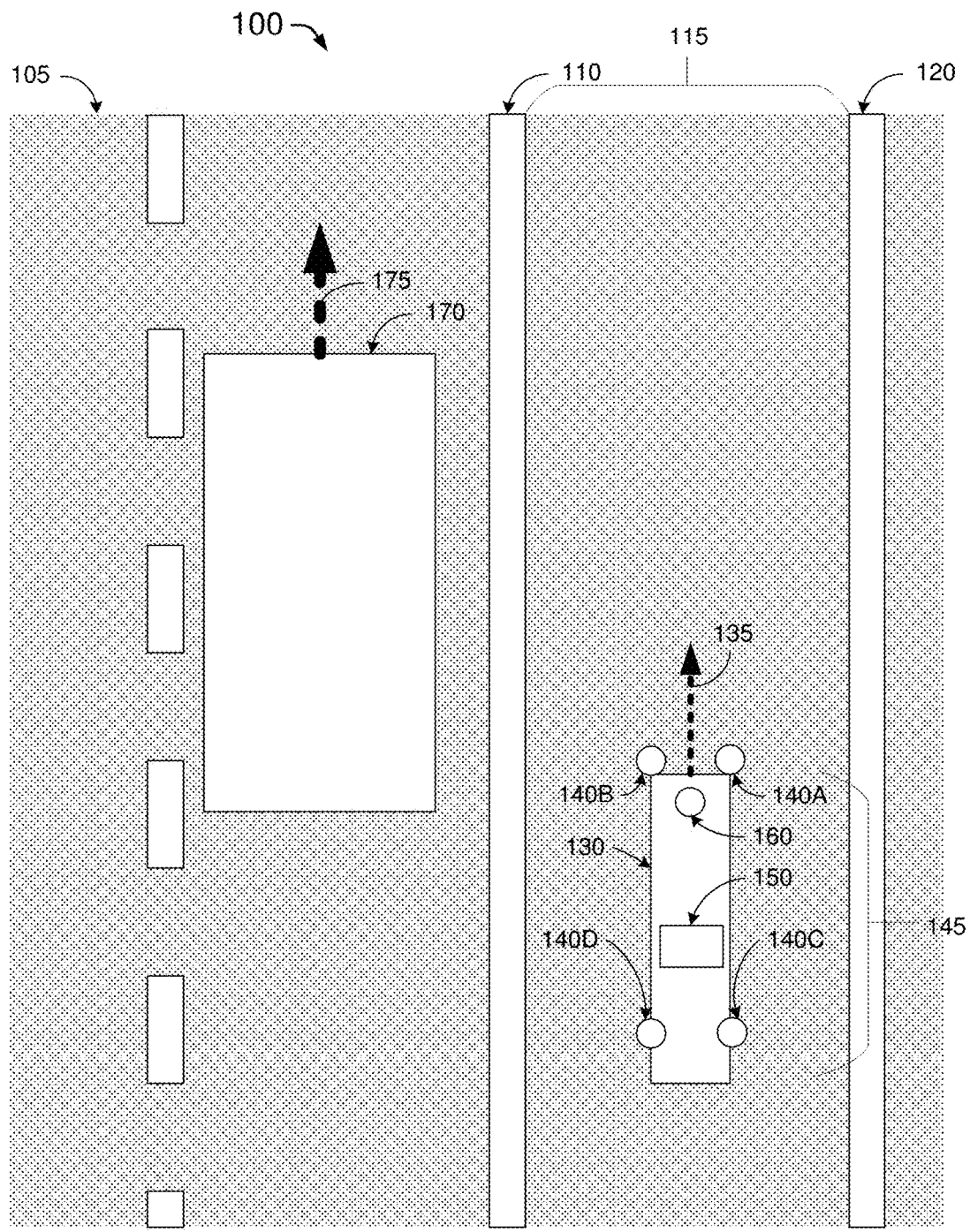
FIG. 1 is a diagram depicting an example environment in which example embodiments of the present disclosure may be implemented.

FIG. 1 illustrates an example environment 100 in which example embodiments of the present disclosure may be implemented. In example environment 100, a road surface 105 may be designed to allow both automobile traffic and bicycle traffic to travel thereon. One or more lines such as a line 110 and a line 120, for example, may be provided on road surface 105 to identify or otherwise designate a bike lane 115 on road surface 105. In some environments, road surface 105 may include a single line (e.g., line 110) to designate bike lane 115. Either or both of lines 110 and 120 may be solid, broken or in another pattern, and may be of any color and any texture. Accordingly, automobile traffic, including an automobile 170, may travel on road surface 105 while bicycle traffic, including a bicycle 130, may travel within bike lane 115 on road surface 105. In example environment 100, bicycle 130 generally travels in a direction 135, e.g., forward, and automobile 170 generally travels in a direction 175, e.g., forward, similar or identical to that of direction 135.

In example environment 100, bicycle 130 may be equipped with a stability control system 145 which may include, for instance, a plurality of sensors 140A-140D, a controller 150 and a stability adjustment mechanism 160. It is noteworthy that, although a set number of sensors is shown in FIG. 1, i.e., four, the number of sensors may vary in various embodiments of the present disclosure. Each of the one or more sensors 140A-140D may be communicatively connected to controller 150 and may include, but not limited to, one or more of the following: a gyroscope, an accelerometer, a steering angle position sensor, a wheel speed sensor, a brake effort sensor, and a pedal effort sensor. Controller 150 may be configured to monitor one or more parameters related to a movement of bicycle 130 to detect an impending occurrence of an event related to bicycle 130 based on the monitoring, using data received from the plurality of sensors 140A-140D. The event in concern may include, for example, falling of bicycle 130 due to a lean angle of bicycle 130 exceeding a threshold angle. The one or more parameters related to the movement of bicycle 130 may include, but not limited to, one or more of the following: a lean angle of bicycle 130, a speed of bicycle 130, an acceleration of bicycle 130, a steering angle of bicycle 130, a wheel speed of bicycle 130, a measurement of brake effort, and a measurement of pedal effort.

Stability adjustment mechanism 160 may be communicatively connected to controller 150 and controlled by controller 150. Stability adjustment mechanism 160 may be configured to adjust one or more operations related to the movement of bicycle 130, including active braking of bicycle 130, to prevent the occurrence of the event. In some embodiments, the one or more operations related to the movement of bicycle 130 may include, but not limited to, one or more of the following: steering, braking, and pedaling of bicycle 130. In some embodiments, in adjusting the one or more operations of bicycle 130, stability adjustment mechanism 160 may be configured to adjust either or both of a balance and a speed of bicycle 130.

Accordingly, embodiments of the present disclosure may monitor various parameters related to movement of bicycle 130 to determine whether cornering stability of bicycle 130 may be lost, e.g., due to excessive lean angle of bicycle 130, and adjust one or more operations related to movement of bicycle 130 to prevent loss of stability of bicycle 130. Thus, embodiments of the present disclosure would assist a cyclist to prevent bicycle 130 from losing stability and falling. Advantageously this would tremendously improve the safety of the cyclist.

Figure 2:
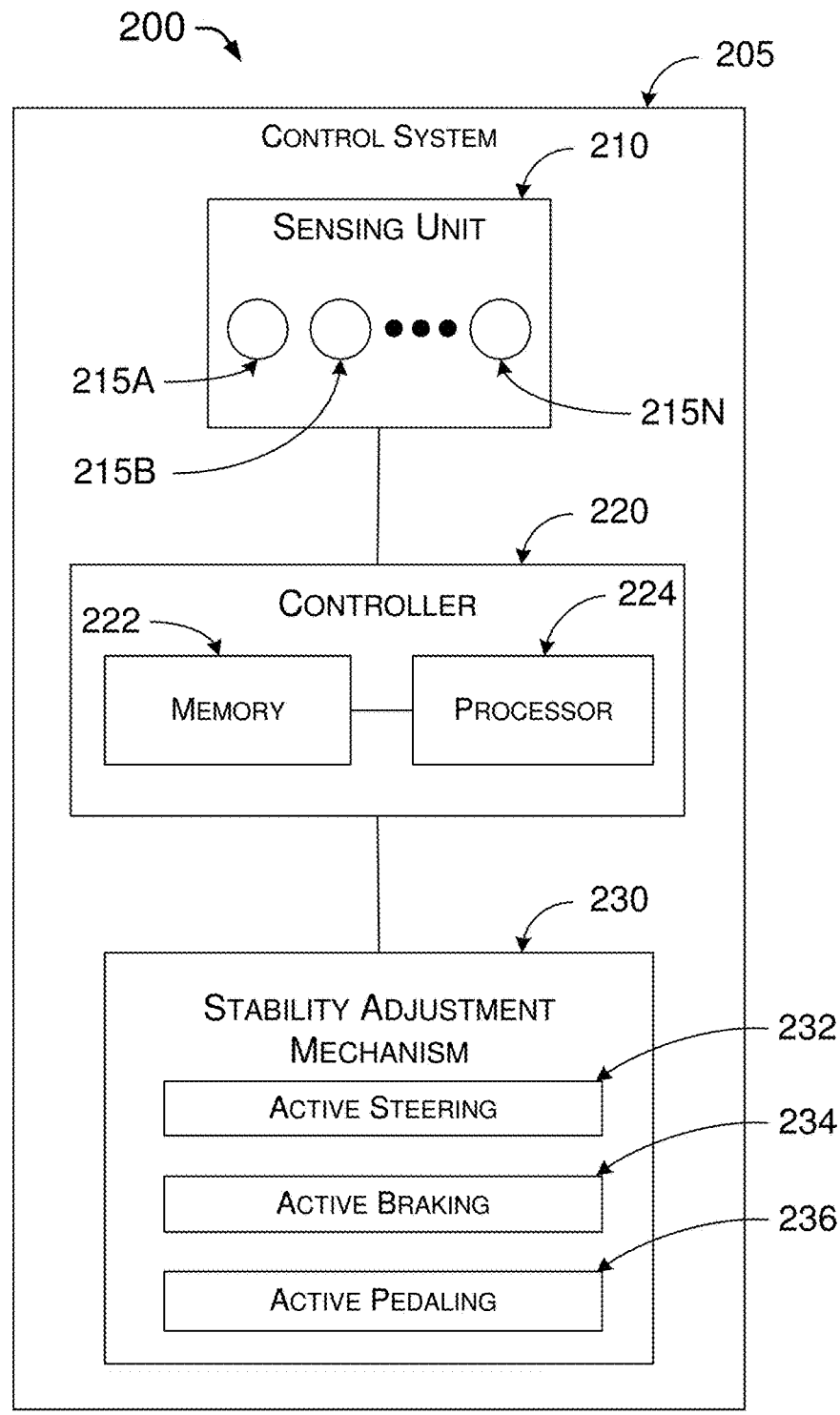
FIG. 2 is a block diagram depicting an example apparatus in accordance with an embodiment of the present disclosure.

FIG. 2 illustrates an example apparatus 200 in accordance with an embodiment of the present disclosure. Example apparatus 200 may include a control system 205 which may include a sensing unit 210, a controller 220 and a stability adjustment mechanism 230. Sensing unit 210 may include a number of sensors 215A-215N, where N is a positive integer greater than 1. Example apparatus 200 may be implemented in example environment 100, and may be installed on a bicycle such as bicycle 130. That is, sensors 215A-215N may be an implementation of sensors 140A-140D, controller 220 may be an implementation of controller 150, and stability adjustment mechanism 230 may be an implementation of steering adjustment mechanism 160. Control system 205 may be installed on a bicycle, e.g., bicycle 130, and configured to detect an impending occurrence of an event related to the bicycle. Control system 205 may also be configured to adjust one or more operations of a plurality of operations related to the movement of the bicycle, including braking of the bicycle, to prevent the occurrence of the event.

In some embodiments, in detecting the impending occurrence of an event related to the bicycle, control system 205 may perform a number of operations. For example, control system 205 may monitor one or more parameters related to a movement of the bicycle, and determine that an occurrence of the event related to the bicycle is imminent based on the monitoring. For example, the event may be the falling of the bicycle due to a lean angle of the bicycle exceeding a threshold angle. In some embodiments, in monitoring of the one or more parameters related to the movement of the bicycle, control system 205 may monitor one or more of a lean angle of the bicycle, a speed of the bicycle, an acceleration of the bicycle, a steering angle of the bicycle, a wheel speed of the bicycle, a measurement of brake effort, and a measurement of pedal effort. Moreover, control system 205 may utilize sensors 215A-215N of sensing unit 210 to perform the monitoring.

Sensors 215A-215N may include, for example, one or more of the following: a gyroscope, an accelerometer, a steering angle position sensor, a wheel speed sensor, a brake effort sensor, and a pedal effort sensor. The gyroscope and accelerometer may be utilized to measure the bicycle's dynamics including, but not limited to, lean angle and cornering speed of the bicycle during maneuvering. The steering angle position sensor may be utilized to measure the steering angle or the bicycle. The brake effort sensor may be utilized to measure an amount of effort put in by the cyclist in braking the bicycle. The wheel speed sensor may be utilized to measure a speed of a wheel speed of the bicycle. The pedal effort sensor may be utilized to measure an amount of effort put in by the cyclist in pedaling the bicycle. The wheel speed sensor and brake effort sensor may also be utilized to provide traction information, which would aid in maintaining stability of the bicycle and further increase the robustness of control system 205. Each of sensors 215A-215N may output raw or processed data indicative or otherwise representative of the respective sensed or measured parameter(s). The term "raw data" herein refers to data not processed before being outputted. For example, the information sensed may be outputted as analog signals, e.g., in the form of electrical current and/or voltage, representative of the sensed information. The term "processed data" herein refers to data having been processed before being outputted, e.g., in the digital form. For example, the sensed information may be in the analog form and may be processed and outputted in the digital form.

Controller 220 may be communicatively connected to sensing unit 210, e.g., wirelessly or via one or more wires, to receive the raw or processed data from sensors 215A-215N. Controller 220 may include a memory 222 and a processor 224 coupled to memory 222. Memory 222 may be configured to store data, e.g., the raw or processed data received from sensing unit 210, as well as one or more sets of processor-executable instructions. At least one of the one or more sets of instructions may be executable by processor 224 to monitor one or more parameters related to a movement of the bicycle to detect an impending occurrence of an event related to the bicycle based on the monitoring such as, for example, falling of the bicycle due to a lean angle of the bicycle exceeding a threshold angle. For instance, processor 224 may monitor one or more of the lean angle of the bicycle, the speed of the bicycle, the acceleration of the bicycle, the steering angle of the bicycle, the wheel speed of the bicycle, the measurement of brake effort, and the measurement of pedal effort, via the sensors 215A-215N of sensing unit 210. Upon detecting the impending occurrence of the event, processor 224 may output one or more command signals to adjust maneuvering of the bicycle.

Stability adjustment mechanism 230 may include an active steering mechanism 232. Optionally, stability adjustment mechanism 230 may also include an active braking mechanism 234. Still optionally, stability adjustment mechanism 230 may further include an active pedaling mechanism 236. Stability adjustment mechanism 230 may receive one or more command signals from processor 224 of controller 220 to adjust one or more operations related to the movement of the bicycle, including braking of the bicycle, to prevent the occurrence of the event. In adjust the one or more operations related to the movement of the bicycle, control system 205 may be configured to perform a number of operations including, but not limited to: (1) identifying at least one operation of the plurality of operations related to the movement of the bicycle for adjustment; (2) determining an amount of adjustment to apply to the at least one operation; (3) applying the determined amount of adjustment to the at least one operation; (4) monitoring a result of the adjustment of the at least one operation; (5) determining whether an additional adjustment to the at least one operation is required or whether at least one other operation of the plurality of operations related to the movement of the bicycle needs to be adjusted; and (6) applying the additional adjustment to the at least one operation in response to a determination that the additional adjustment to the at least one operation is required or adjusting the at least one other operation in response to a determination that the at least one other operation needs to be adjusted.

Upon receiving a command signal from processor 224, active steering mechanism 232 may adjust the steering angle of the bicycle. For example, when processor 224 detects an impending fall of the bicycle by means of lean angle measurement, e.g., the lean angle of the bicycle exceeding a threshold angle, processor 224 may output a command signal to active steering mechanism 232 to adjust the balance of the bicycle via active steering control. Upon receiving a command signal from processor 224, active braking mechanism 234 may adjust the braking of the bicycle. For example, when processor 224 detects an impending fall of the bicycle due to excessive cornering speed, processor 224 may output a command signal to active braking mechanism 234 to adjust the braking of the bicycle to apply braking force on one or both wheels of the bicycle to decrease the speed of the bicycle. Upon receiving a command signal from processor 224, active pedaling mechanism 236 may adjust the pedaling of the bicycle. For example, when processor 224 detects an impending fall of the bicycle due to insufficient speed, processor 224 may output a command signal to active pedaling mechanism 236 to adjust the pedaling of the bicycle to increase the speed of the bicycle. In some embodiments, processor 224 may output command signals to stability adjustment mechanism 230 to adjust either or both of the balance and speed of the bicycle.

Figure 3:
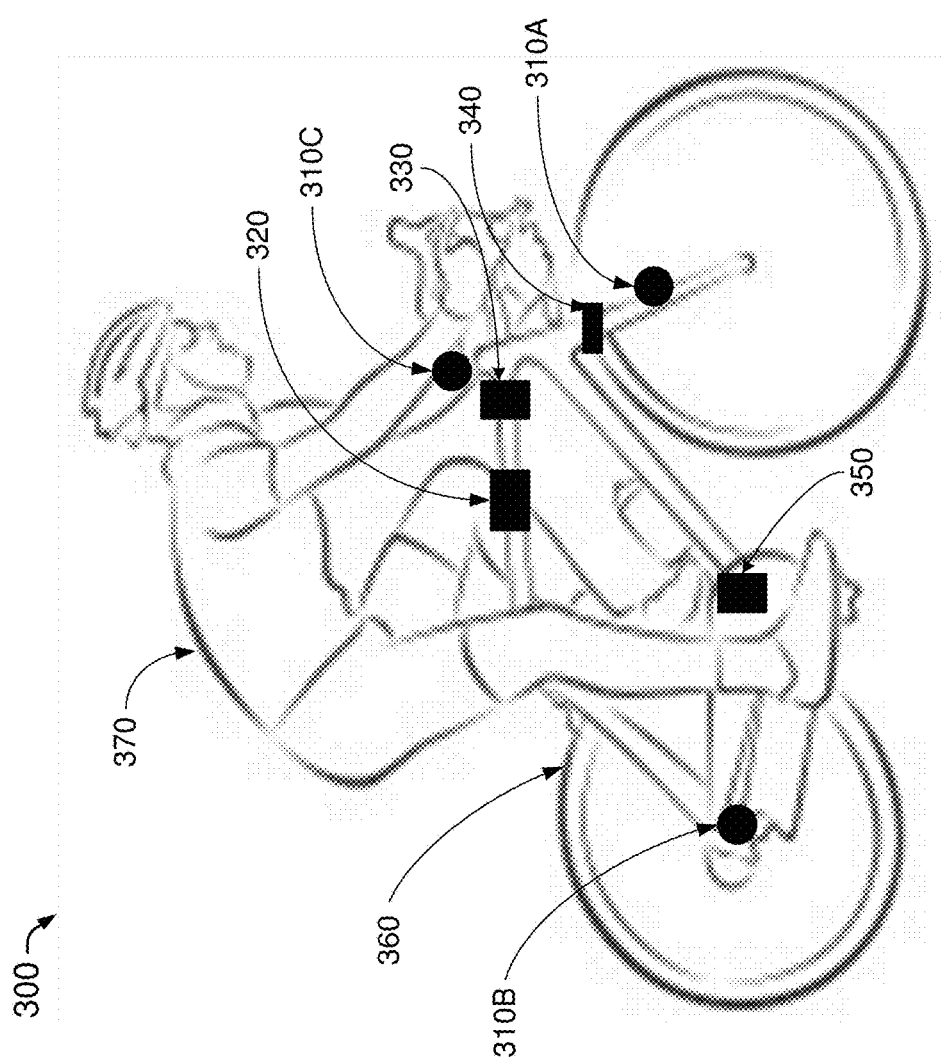
FIG. 3 is a diagram depicting an example scenario implementing an embodiment in accordance with the present disclosure.

FIG. 3 is a diagram depicting an example scenario 300 implementing an embodiment in accordance with the present disclosure. In example scenario 300, a cyclist 370 rides a bicycle 360 which is equipped with the aforementioned active stability control system. Active stability control system may be a built-in solution or an aftermarket solution. In the former case the combination of bicycle 360 and the active stability control system may be considered as an apparatus. Active stability control system may include a number of sensors 310A-310C, a controller 320 and a stability adjustment mechanism, which may include one or more of an active steering mechanism 330, an active braking mechanism 340 and an active pedaling mechanism 350. Example scenario 300 may be one of various implementations of example environment 100 and example apparatus 200, and may be installed on a bicycle such as bicycle 130. That is, sensors 310A-310C may be an implementation of sensors 140A-140D and/or 215A-215N, controller 320 may be an implementation of controller 150 and/or 220, and stability adjustment mechanism may be an implementation of stability adjustment mechanism 160 and/or 230. In particular, active steering mechanism 330 may be an implementation of active steering mechanism 232, active braking mechanism 340 may be an implementation of active braking mechanism 234, and an active pedaling mechanism 350 may be an implementation of active pedaling mechanism 236.

Sensors 310A-310C may include, for example, one or more of the following: a gyroscope, an accelerometer, a steering angle position sensor, a wheel speed sensor, a brake effort sensor, and a pedal effort sensor. The gyroscope and accelerometer may be utilized to measure the bicycle's dynamics including, but not limited to, lean angle and cornering speed of the bicycle during maneuvering. The steering angle position sensor may be utilized to measure the steering angle or the bicycle. The brake effort sensor may be utilized to measure an amount of effort put in by the cyclist in braking the bicycle. The wheel speed sensor may be utilized to measure a speed of a wheel speed of the bicycle. The pedal effort sensor may be utilized to measure an amount of effort put in by the cyclist in pedaling the bicycle. The wheel speed sensor and brake effort sensor may also be utilized to provide traction information, which would aid in maintaining stability of the bicycle and further increase the robustness of the active stability control system. Each of sensors 310A-310C may output raw or processed data indicative or otherwise representative of the respective sensed or measured parameter(s).

Controller 320 may be communicatively connected to sensors 310A-310C, e.g., wirelessly or via one or more wires, to receive the raw or processed data from sensors 310A-310C. Controller 320 may monitor one or more parameters related to a movement of bicycle 360 to detect an impending occurrence of an event related to bicycle 360 based on the monitoring such as, for example, falling of bicycle 360 due to a lean angle of bicycle 360 exceeding a threshold angle. For instance, controller 320 may monitor one or more of the lean angle of bicycle 360, the speed of bicycle 360, the acceleration of bicycle 360, the steering angle of bicycle 360, the wheel speed of bicycle 360, the measurement of brake effort, and the measurement of pedal effort, via the sensors 310A-310C. Upon detecting the impending occurrence of the event, controller 320 may output one or more command signals to adjust maneuvering of bicycle 360.

Upon receiving a command signal from controller 320, active steering mechanism 330 may adjust the steering angle of bicycle 360. For example, when controller 320 detects an impending fall of bicycle 360 by means of lean angle measurement, e.g., the lean angle of bicycle 360 exceeding a threshold angle, controller 320 may output a command signal to active steering mechanism 330 to adjust the balance of bicycle 360 via active steering control. Upon receiving a command signal from controller 320, active braking mechanism 340 may adjust the braking of bicycle 360. For example, when controller 320 detects an impending fall of bicycle 360 due to excessive cornering speed, controller 320 may output a command signal to active braking mechanism 340 to adjust the braking of bicycle 360 to apply braking force on one or both wheels of bicycle 360 to decrease the speed of bicycle 360. Upon receiving a command signal from controller 320, active pedaling mechanism 360 may adjust the pedaling of bicycle 360. For example, when controller 320 detects an impending fall of bicycle 360 due to insufficient speed, controller 320 may output a command signal to active pedaling mechanism 360 to adjust the pedaling of bicycle 360 to increase the speed of bicycle 360. In some embodiments, controller 320 may output command signals to adjust either or both of the balance and speed of bicycle 360.

Figure 4:
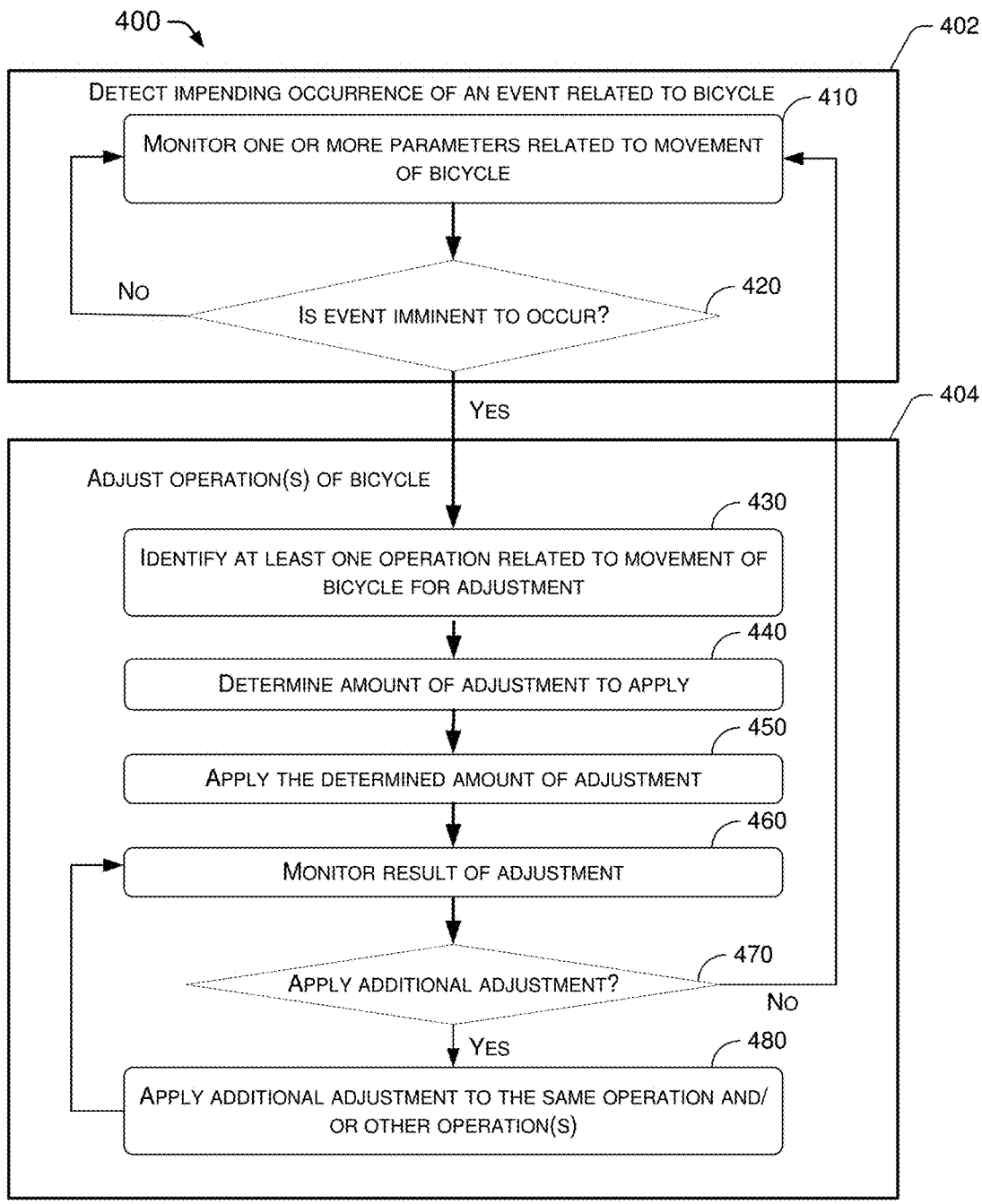
FIG. 4 is a flowchart of an example process in accordance with an embodiment of the present disclosure.

FIG. 4 illustrates an example process 400 in accordance with an embodiment of the present disclosure. Example process 400 may include one or more operations, actions, or functions shown as blocks such as 402 and 404 which may encompass sub-blocks 410, 420, 430, 440, 450, 460, 470 and 480. Although illustrated as discrete blocks, various blocks may be divided into additional blocks, combined into fewer blocks, or eliminated, depending on the desired implementation. Example process 400 may be implemented in example environment 100, example apparatus 200 and/or example scenario 300. For simplicity of description and not limiting the scope thereof, example process 400 is described below in the context of implementation using example apparatus 200. Example process 400 may begin with block 402.

At 402, example process 400 may involve control system 205, installed on a bicycle such as bicycle 130 or bicycle 360, detecting an impending occurrence of an event related to the bicycle. Block 402 may be followed by block 404.

At 404, example process 400 may involve control system 205 adjusting one or more operations of a plurality of operations related to the movement of the bicycle, including braking of the bicycle, to prevent the occurrence of the event. In some embodiments, the plurality of operations related to the movement of the bicycle may include, for example, steering, braking, and pedaling of the bicycle.

In detecting the impending occurrence of the event related to the bicycle, example process 400 may involve a number of operations including 410 and 420.

At 410, example process 400 may involve control system 205 monitoring one or more parameters related to a movement of the bicycle. In some embodiments, in monitoring the one or more parameters related to the movement of the bicycle, example process 400 may involve control system 205 monitoring one or more of a lean angle of the bicycle, a speed of the bicycle, an acceleration of the bicycle, a steering angle of the bicycle, a wheel speed of the bicycle, a measurement of brake effort, and a measurement of pedal effort. In some embodiments, with respect to monitoring, example process 400 may involve control system 205 monitoring by using sensors 215A-215N of sensing unit 210 of control system 205. Sensors 215A-215N may include, for example, one or more of a gyroscope, an accelerometer, a steering angle position sensor, a wheel speed sensor, a brake effort sensor, and a pedal effort sensor. Sub-block 410 may be followed by sub-block 420.

At 420, example process 400 may involve control system 205 determining that an occurrence of the event related to the bicycle is imminent based on the monitoring. For instance, control system 205 may determine that the bicycle is likely to fall due to a lean angle of the bicycle exceeding a threshold angle. In some embodiments, in adjusting the one or more operations related to the movement of the bicycle, example process 400 may involve control system 205 adjusting the one or more operations to control either or both of a balance and a speed of the bicycle. In response to control system 205 determining that the occurrence of the event is not imminent or unlikely, example process 400 may proceed to sub-block 410 to continue to monitor the one or more parameters related to the movement of the bicycle.

In adjusting the one or more operations of the plurality of operations related to the movement of the bicycle, example process 400 may involve a number of operations including 430, 440, 450, 460, 470 and 480.

At 430, example process 400 may involve control system 205 identifying at least one operation of the plurality of operations related to the movement of the bicycle for adjustment. For instance, control system 205 may decide which one or more of steering, braking, and pedaling of the bicycle to adjust. Sub-block 430 may be followed by sub-block 440.

At 440, example process 400 may involve control system 205 determining an amount of adjustment to apply to the at least one operation. For instance, control system 205 may determine how much steering, braking and/or pedaling to perform in performing the adjustment. Sub-block 440 may be followed by sub-block 450.

At 450, example process 400 may involve control system 205 applying the determined amount of adjustment to the at least one operation. For instance, after determining how much (amount of) adjustment to be applied, control system 205 may adjust the steering, braking and/or pedaling by the determined amount. Sub-block 450 may be followed by sub-block 460.

At 460, example process 400 may involve control system 205 monitoring a result of the adjustment of the at least one operation. For instance, control system 205 may continuously monitor the result of the adjustment as feedback. Sub-block 460 may be followed by sub-block 470.

At 470, example process 400 may involve control system 205 determining whether an additional adjustment to the at least one operation is required or whether at least one other operation of the plurality of operations related to the movement of the bicycle needs to be adjusted. For instance, control system 205 may determine whether the applied amount of adjustment is just right, insufficient, or excessive to achieve the purpose of negating the occurrence of the event. If it is determine that additional adjustment is required (e.g., due to the previously applied adjustment being insufficient or excessive), control system 205 may determine whether additional adjustment of the same type or another different type is to be applied. For example, if adjustment in steering was previously applied and it is now determined that the applied adjustment in steering is insufficient to negate the occurrence of the event, control system 205 may determine that additional adjustment in steering. Alternatively or additionally, control system 205 may determine that adjustment in braking and/or pedaling is to be applied to negate the occurrence of the event, such as falling of the bicycle due to a lean angle of the bicycle exceeding a threshold angle. However, if it is determined that neither additional adjustment to the at least one operation nor adjustment in at least one other operation is required, example process 400 may proceed to sub-block 410 of block 402 to continue monitoring the one or more parameters related to the movement of the bicycle. Sub-block 470 may be followed by sub-block 480.

At 480, example process 400 may involve control system 205 applying the additional adjustment to the at least one operation in response to a determination that the additional adjustment to the at least one operation is required or adjusting the at least one other operation in response to a determination that the at least one other operation needs to be adjusted.

After applying the additional adjustment to the at least one operation or adjusting at least one other operation, control system 205 may proceed to sub-block 460 to continue to monitor the result of the additional adjustment or the application of the at least one other operation.

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

What is claimed is:

1. A method, comprising:
  detecting, by a control system installed on a bicycle, an impending occurrence of an event related to the bicycle based at least in part on one or more parameters related to a movement of the bicycle, the one or more parameters comprising a measurement of brake effort, a measurement of pedal effort, or both; and
  adjusting, by the control system, one or more operations of a plurality of operations related to the movement of the bicycle, including braking of the bicycle, to prevent the occurrence of the event.

2. The method of claim 1, wherein the detecting of the impending occurrence of an event related to the bicycle comprises:
  monitoring, by the control system, the one or more parameters related to the movement of the bicycle; and
  determining, by the control system, that an occurrence of the event related to the bicycle is imminent based on the monitoring, the event comprising falling of the bicycle due to a lean angle of the bicycle exceeding a threshold angle.

3. The method of claim 2, wherein the one or more parameters related to the movement of the bicycle further comprises a lean angle of the bicycle, a speed of the bicycle, an acceleration of the bicycle, a steering angle of the bicycle, a wheel speed of the bicycle, or a combination thereof.

4. The method of claim 2, wherein the monitoring comprises monitoring by using a plurality of sensors of the control system, the sensors comprising one or more of a gyroscope, an accelerometer, a steering angle position sensor, a wheel speed sensor, a brake effort sensor, and a pedal effort sensor.

5. The method of claim 1, wherein the adjusting of the one or more operations related to the movement of the bicycle comprises:
  identifying at least one operation of the plurality of operations related to the movement of the bicycle for adjustment;
  determining an amount of adjustment to apply to the at least one operation;
  applying the determined amount of adjustment to the at least one operation;
  monitoring a result of the adjustment of the at least one operation;
  determining whether an additional adjustment to the at least one operation is required or whether at least one other operation of the plurality of operations related to the movement of the bicycle needs to be adjusted;
  applying the additional adjustment to the at least one operation in response to a determination that the additional adjustment to the at least one operation is required; and
  adjusting the at least one other operation in response to a determination that the at least one other operation needs to be adjusted.

6. The method of claim 1, wherein the plurality of operations related to the movement of the bicycle comprise steering, braking, and pedaling of the bicycle.

7. The method of claim 1, wherein the adjusting of the one or more operations related to the movement of the bicycle comprises adjusting the one or more operations to control either or both of a balance and a speed of the bicycle.

8. An apparatus, comprising:
  a control system for a bicycle, comprising:
    a controller configured to monitor one or more parameters related to a movement of the bicycle, the controller further configured to detect an impending occurrence of an event based on the monitoring; and
    a stability adjustment mechanism controlled by the controller and configured to adjust one or more operations related to the movement of the bicycle, including braking of the bicycle, to prevent the occurrence of the event,
    wherein the one or more parameters comprise a measurement of brake effort, a measurement of pedal effort, or both.

9. The apparatus of claim 8, wherein the one or more parameters related to the movement of the bicycle further comprise one or more of a lean angle of the bicycle, a speed of the bicycle, an acceleration of the bicycle, a steering angle of the bicycle, a wheel speed of the bicycle, or a combination thereof.

10. The apparatus of claim 8, wherein the one or more operations related to the movement of the bicycle comprise one or more of steering, braking, and pedaling of the bicycle.

11. The apparatus of claim 8, wherein the control system further comprises a plurality of sensors communicatively coupled to the controller, and wherein the controller is configured to monitor the one or more parameters related to the movement of the bicycle to detect the impending occurrence of the event using data received from the plurality of sensors.

12. The apparatus of claim 11, wherein the plurality of sensors comprise one or more of a gyroscope, an accelerometer, a steering angle position sensor, a wheel speed sensor, a brake effort sensor, and a pedal effort sensor.

13. The apparatus of claim 8, wherein, in adjusting of the one or more operations of the bicycle, the stability adjustment mechanism is configured to adjust either or both of a balance and a speed of the bicycle by a steering mechanism of the control system.

14. The apparatus of claim 8, wherein the event comprises falling of the bicycle due to a lean angle of the bicycle exceeding a threshold angle.

15. An apparatus, comprising:
  a bicycle; and
  a control system installed on the bicycle, comprising:
    a controller configured to monitor one or more parameters related to a movement of the bicycle, the controller further configured to detect an impending occurrence of an event based on the monitoring; and
    a stability adjustment mechanism controlled by the controller and configured to adjust one or more operations related to the movement of the bicycle, including braking of the bicycle, to prevent the occurrence of the event wherein the one or more parameters comprise a measurement of brake effort, a measurement of pedal effort, or both.

16. The apparatus of claim 15, wherein the one or more parameters related to the movement of the bicycle further comprise one or more of a lean angle of the bicycle, a speed of the bicycle, an acceleration of the bicycle, a steering angle of the bicycle, a wheel speed of the bicycle, or a combination thereof.

17. The apparatus of claim 15, wherein the one or more operations related to the movement of the bicycle comprise one or more of steering, braking, and pedaling of the bicycle.

18. The apparatus of claim 15, wherein control system further comprises a plurality of sensors communicatively coupled to the controller, and wherein the controller is configured to monitor the one or more parameters related to the movement of the bicycle to detect the impending occurrence of the event using data received from the plurality of sensors.

19. The apparatus of claim 18, wherein the plurality of sensors comprise one or more of a gyroscope, an accelerometer, a steering angle position sensor, a wheel speed sensor, a brake effort sensor, and a pedal effort sensor.

20. The apparatus of claim 15, wherein, in adjusting of the one or more operations of the bicycle, the stability adjustment mechanism is configured to adjust either or both of a balance and a speed of the bicycle by a steering mechanism of the control system.

\* \* \* \* \*